United States Patent
Johnson et al.

(10) Patent No.: US 7,609,491 B2
(45) Date of Patent: Oct. 27, 2009

(54) CLOTHES DRYER MOTOR WITH BROKEN BELT SWITCH

(75) Inventors: Philip S. Johnson, Granite City, IL (US); Marshall J. Huggins, Kirkwood, MO (US); Michael Peebles, Merritt, NC (US); John R. Holden, Trent Woods, NC (US)

(73) Assignee: Emerson Electric Co., St. Louis, MO (US)

( * ) Notice: Subject to any disclaimer, the term of this patent is extended or adjusted under 35 U.S.C. 154(b) by 279 days.

(21) Appl. No.: 11/549,192

(22) Filed: Oct. 13, 2006

(65) Prior Publication Data
US 2008/0088989 A1     Apr. 17, 2008

(51) Int. Cl.
*H02H 7/08* (2006.01)
(52) U.S. Cl. ............................. 361/23; 361/31; 34/524; 34/572; 34/526
(58) Field of Classification Search .................... 34/524, 34/572, 526; 361/23, 31
See application file for complete search history.

(56) References Cited

U.S. PATENT DOCUMENTS

| 3,890,719 | A | | 6/1975 | Braga et al. | |
|---|---|---|---|---|---|
| 3,890,720 | A | | 6/1975 | Nichols | |
| 4,275,508 | A | * | 6/1981 | Jones | 34/524 |
| 4,488,363 | A | * | 12/1984 | Jackson et al. | 34/572 |
| 6,941,679 | B1 | | 9/2005 | Harris et al. | |
| 6,967,297 | B2 | | 11/2005 | Muller et al. | |

* cited by examiner

*Primary Examiner*—Rita Leykin
(74) *Attorney, Agent, or Firm*—Senniger Powers LLP

(57) ABSTRACT

A clothes dryer includes a motor adapted to be mounted on a frame of the dryer for driving a dryer belt to rotate a drum of the dryer. The motor includes a rotor adapted to rotate the belt, at least one winding energizable to cause rotation of the rotor, and a first switch operable to control energization of the winding. A second switch has a sensor for sensing belt breakage. The second switch is mounted on the first switch and is electrically connected to the winding so that when the belt is no longer sensed, the second switch stops operation of the winding and thereby stops rotation of the rotor.

17 Claims, 4 Drawing Sheets

CLOTHES DRYER MOTOR WITH BROKEN BELT SWITCH

FIELD OF THE INVENTION

The present invention relates to clothes dryers, and more particularly to motors and drive belts in clothes dryers.

BACKGROUND OF THE INVENTION

Conventional clothes dryers generally include a drum for receiving clothes therein, a heater, and a drive belt and motor for turning the drum to facilitate clothes drying. It is well known that the dryer should automatically turn off the heater and the motor when the belt breaks. The prior art includes a variety of systems for sensing belt breakage and turning off the heater and motor. Some include a switch, separate from a switch in the motor, e.g., mounted on the dryer frame, that is operable to sense belt breakage and is wired into the dryer to turn off the heater and motor. While these prior art systems are generally satisfactory, applicants have discovered a better system to sense belt breakage and to turn off the heater and motor.

SUMMARY OF THE INVENTION

In one aspect of the invention, a clothes dryer motor is adapted to be mounted on a frame of the dryer for driving a dryer belt to rotate a drum of the dryer. The motor includes a rotor adapted to rotate the belt, at least one winding energizable to cause rotation of the rotor, and a first switch operable to control energization of the winding. A second switch has a sensor for sensing belt breakage. The second switch is mounted on the first switch and is electrically connected to the winding so that when the belt is no longer sensed, the second switch stops operation of the winding and thereby stops rotation of the rotor.

In another aspect, the motor includes a motor frame mountable on the dryer frame and has an outwardly facing surface. A belt break switch is mounted on the surface of the motor frame adjacent the belt and having an arm disposed to sense dryer belt breakage, the switch operable to inhibit power to the motor when the dryer belt breaks.

In another aspect, the clothes dryer motor includes a main winding, a start winding operable to cause rotation of the rotor at motor start-up, and a protector assembly electrically connected to the main and start windings. A main switch is operable to stop operation of the start winding at a predetermined rotor speed. A frame mounts the rotor, the windings, the protector assembly and the main switch, and the frame has an outwardly facing surface. The protector assembly includes a belt switch mounted on the outwardly facing surface of the frame and operable to stop operation of the motor in response to arm movement indicating a belt malfunction.

In other aspects, a clothes dryer includes one of the above-described motors. Also, various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION OF THE DRAWINGS

Figure 1:
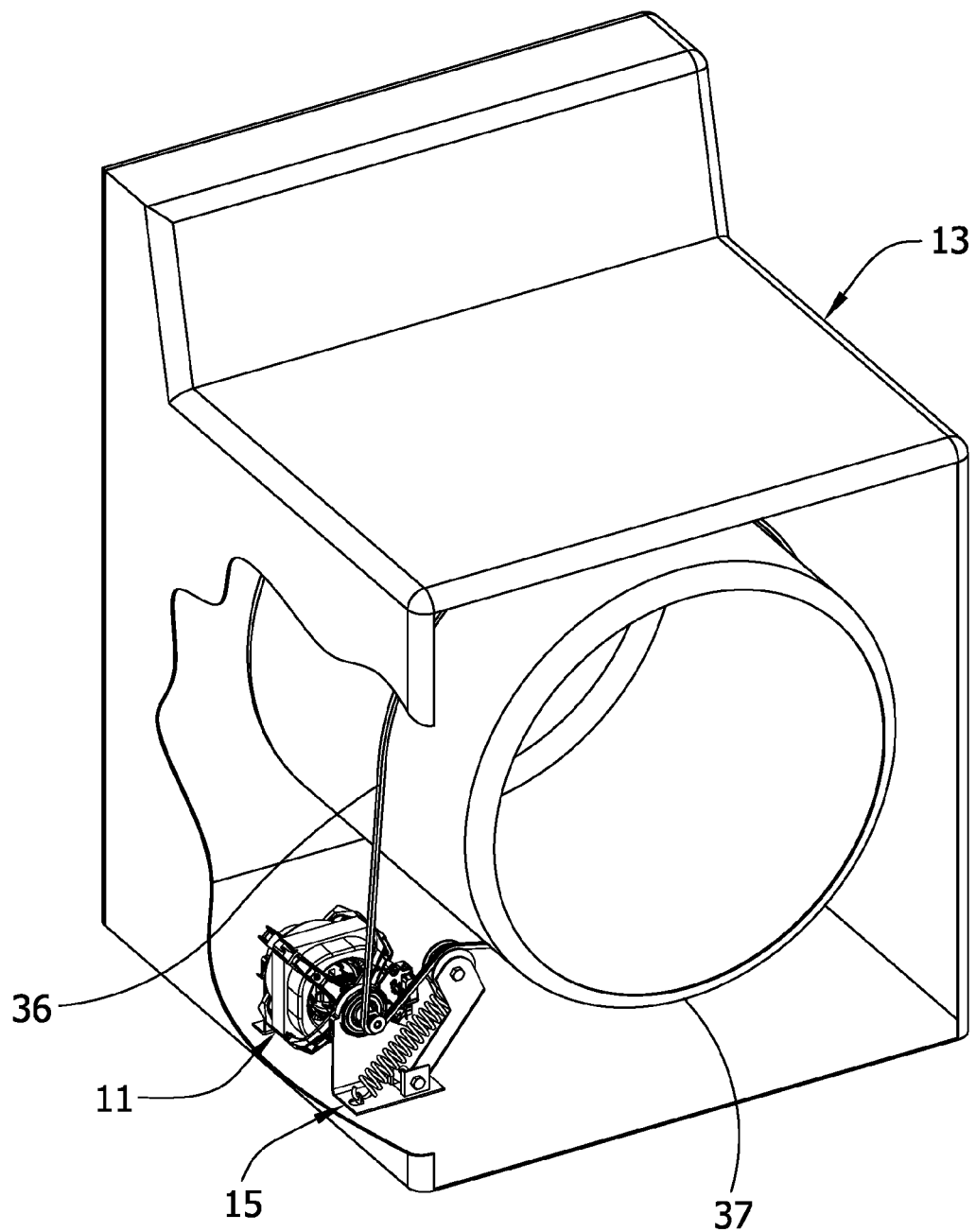
FIG. 1 is a perspective of a dryer including a motor of one embodiment of the invention.
Figure 2:
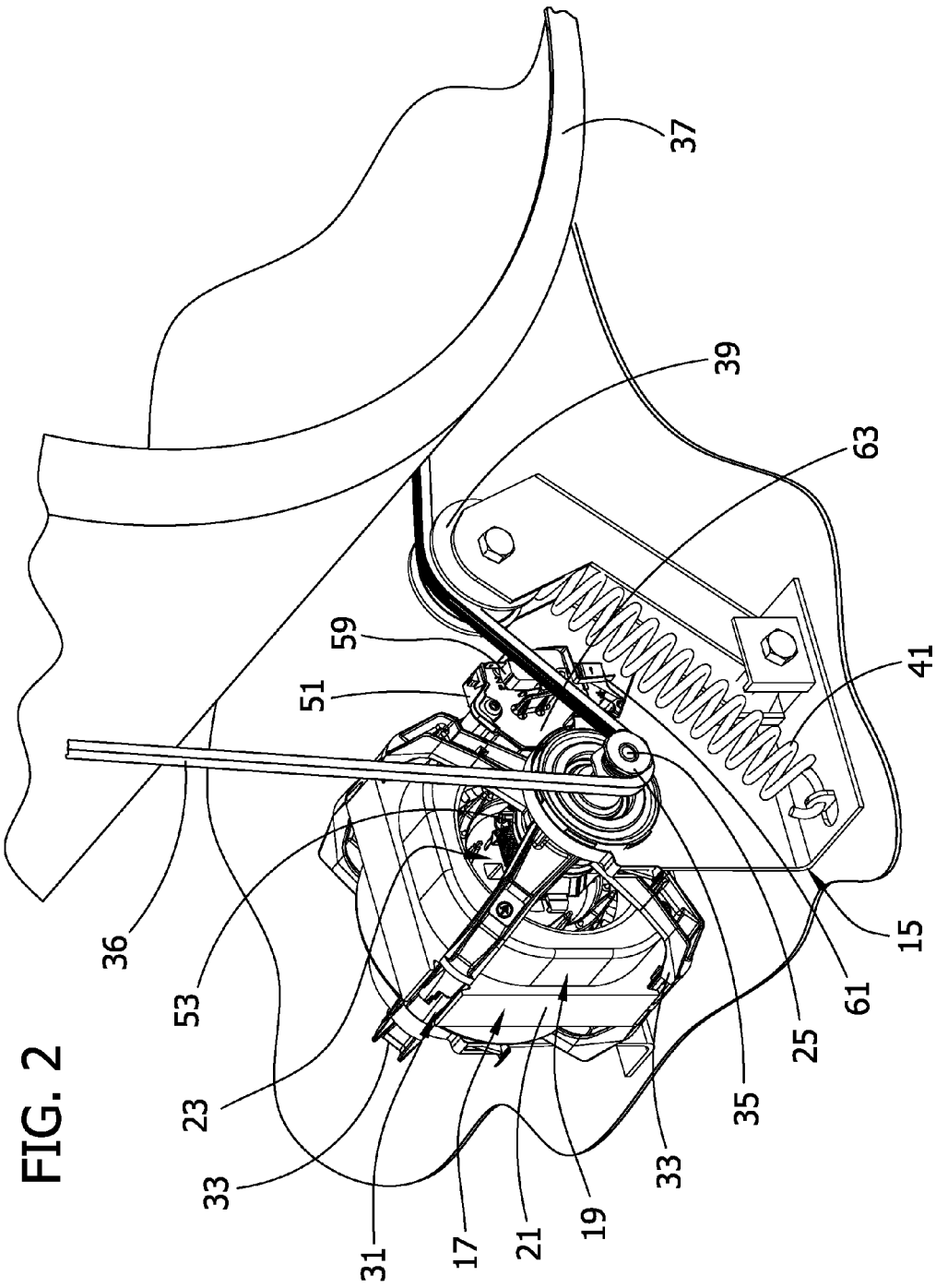
FIG. 2 is an enlarged perspective of the motor of FIG. 1.
Figure 3:
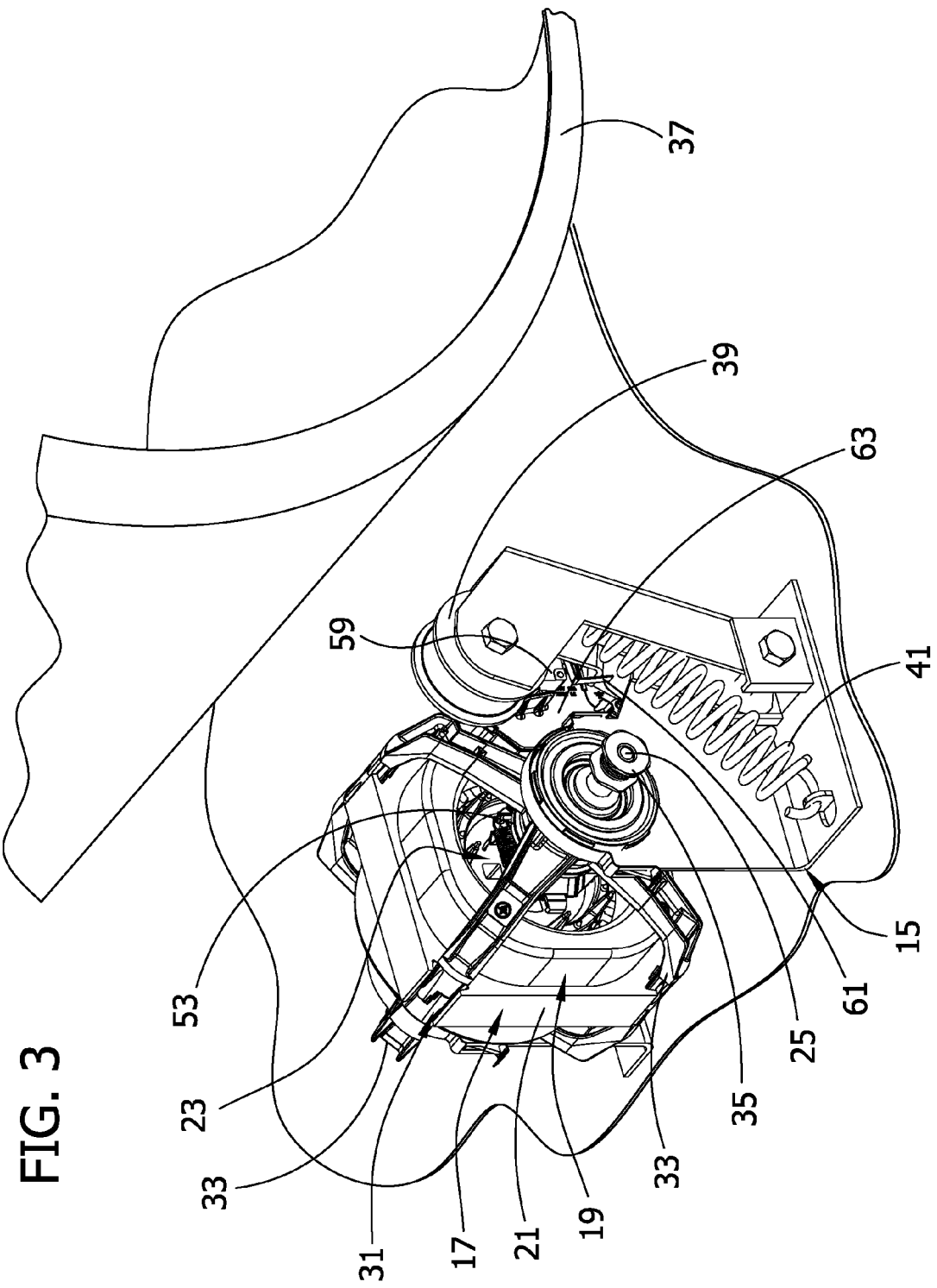
FIG. 3 is like FIG. 2 but showing a broken belt condition.

Referring to FIGS. 1-2, a motor of one embodiment of the invention is generally designated 11. The motor 11 is mounted in a dryer 13 having a dryer frame generally designated 15. The motor 11 generally includes a stator 17 having windings 19 and a stator core 21 including laminations. A rotor generally designated 23 is in magnetic coupling relation with the stator 17 and has a rotor core and a rotor shaft 25. In this embodiment, the windings 19 include a main winding (27 in FIG. 4) generally operable to cause rotation of the rotor 23 and a start winding 29 generally operable to cause rotation of the rotor at motor start-up. The motor 11 also includes a motor frame 31 including endshields 33 secured to the stator core 21.

In this embodiment, one end of the rotor shaft 25 has a grooved pulley 35 for mounting a belt 36 thereon for rotating a dryer drum 37. The belt 36 extends partially around an idler pulley 39 that is rotatably mounted on an idler arm and thereby mounted on the dryer frame 15. In this embodiment, as is conventional, the belt 36 is biased by a spring 41. Note that the belt 36 extends around the drum 37 as is conventional, but may be otherwise connected to rotate or drive the drum.

Figure 4:
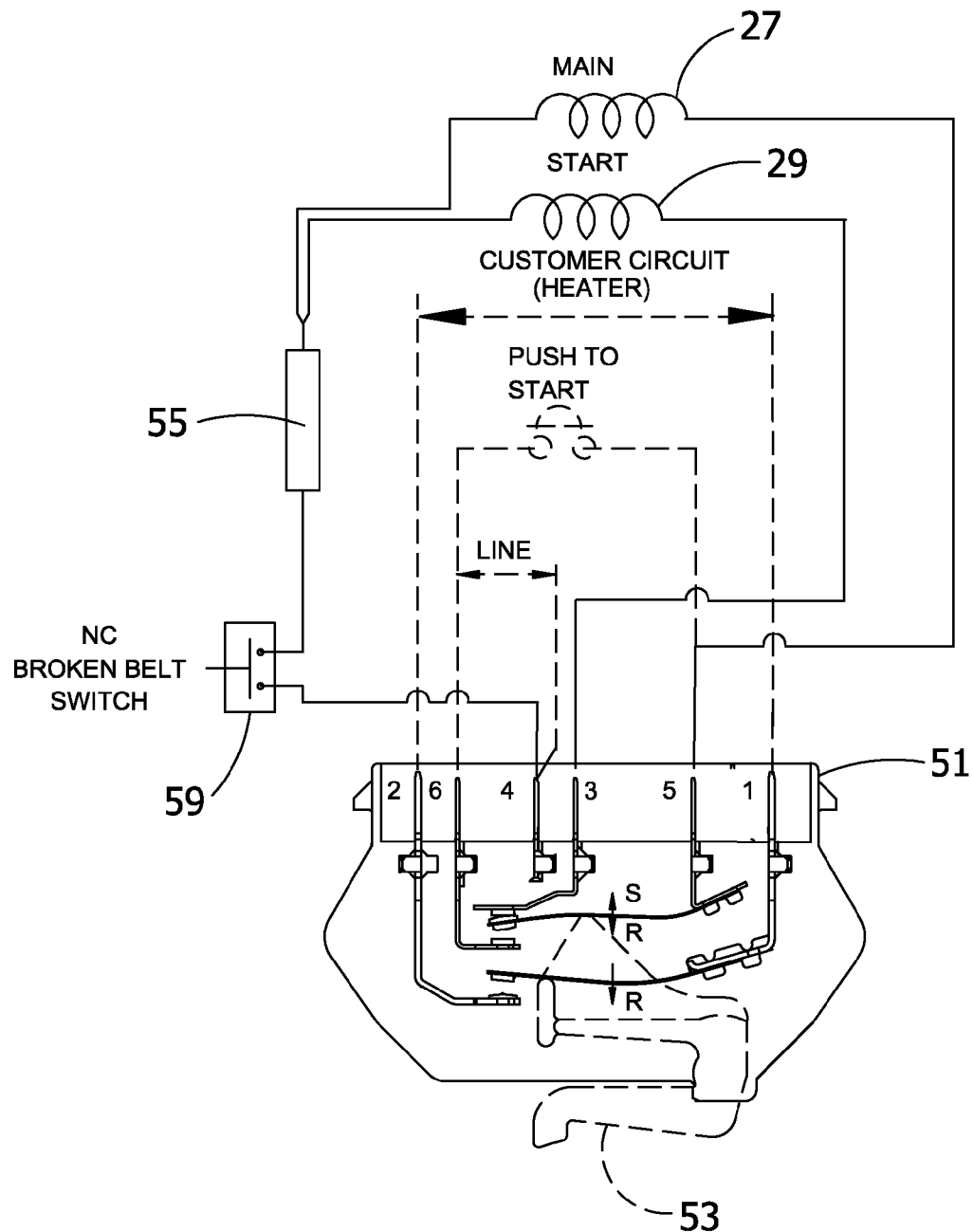
FIG. 4 is an electrical schematic of the components connected to main and start windings of the motor.
Corresponding reference characters indicate corresponding parts throughout the drawings.

Referring to FIG. 4, a schematic shows wiring of the components of this embodiment. A first or main switch 51 is operable to control energization of the main windings 27, and includes a centrifugal actuator 53 to control energization of the start winding 29. A motor protector 55 is electrically connected to the main and start windings 27, 29. The main switch 51, centrifugal actuator 53, protector 55 and the remainder of the components may be conventional, including an optional customer circuit and an optional push-to-start feature.

A second or belt break switch 59 has a sensor generally for sensing the belt 36. The break switch 59 is electrically connected in series with the main and start windings 27, 29 via the protector 55.

The sensor of the break switch 59 is an arm 61 extending from the break switch and disposed for contact with the belt 36. The belt break switch 59 is electrically connected to the winding so that when the belt is no longer sensed, the break switch open circuits the main and start windings 27, 29 to stop energization of the windings and thereby stop rotation of the rotor 23. The break switch 59 is physically mounted on an outwardly facing surface of the motor frame 31. In this embodiment, the outwardly facing surface is that of a mounting plate 63 that is mounted on the main switch 51. Note that the break switch 59 can be otherwise mounted on the motor 11 within the scope of this invention. In one embodiment, the break switch 59, the main switch 51 and the motor frame 31 are provided as an integral unit and the connections between the second switch and the main switch are pre-wired, e.g., using a jumper as shown. This eliminates the need for a separate harness for connecting to the break switch 59.

The break switch 59 is a normally closed (NC) microswitch adapted for automatic reset, so that the switch automatically resets after replacement of the broken belt. However, many other types of switches are contemplated within the scope of the invention.

When the belt 36 breaks, the idler pulley 39 moves due to the spring 41, and triggers the arm of the break switch 59 to open the switch. Opening of the switch causes power to be cut or inhibited to the windings, and thus the motor is stopped.

The dryer 13 also includes a heater that is wired into the "customer circuit" shown in FIG. 4. The motor and dryer are wired together such that opening of the break switch causes the heater operation to cease along with the motor.

When introducing elements of various aspects of the present invention or embodiments thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top" and "bottom", "front" and "rear", "above" and "below" and variations of these and other terms of orientation is made for convenience, but does not require any particular orientation of the components.

As various changes could be made in the above constructions, methods and products without departing from the scope of the invention, it is intended that all matter contained in the above description or shown in the accompanying drawings shall be interpreted as illustrative and not in a limiting sense.

What is claimed is:

1. A clothes dryer motor adapted to be mounted on a frame of the dryer for driving a dryer belt to rotate a drum of the dryer, the motor comprising:
    a rotor adapted to rotate the belt,
    at least one winding energizable to cause rotation of the rotor,
    a first switch operable to control energization of the winding, and
    a second switch having a sensor for sensing belt breakage, the second switch being mounted on the first switch and electrically connected to the winding so that when the belt is no longer sensed, the second switch stops operation of the winding and thereby stops rotation of the rotor.

2. The dryer motor of claim 1 wherein the at least one winding includes a main winding, and a start winding operable to cause rotation of the rotor at motor start-up, the first switch operable to control energization of both windings.

3. The dryer motor of claim 2 further comprising a motor protector electrically connected to the main and start windings, and wherein the second switch is electrically connected in series with the main and start windings.

4. The dryer motor of claim 3 wherein the second switch is a microswitch adapted for automatic reset.

5. The dryer motor of claim 4 wherein the sensor of the second switch is an arm extending from the second switch to the belt, the arm being operable to open the second switch when the belt malfunctions.

6. The dryer motor of claim 1 further comprising a mounting plate mounted between the first and second switches.

7. The dryer motor of claim 1 in combination with the dryer, the dryer including a heater, and wherein the motor and dryer are wired together such that opening of the second switch causes the heater operation to cease.

8. The dryer motor of claim 1 in combination with the dryer, the dryer including an idler arm in contact with the belt and adapted to pivot upon belt breakage, the idler arm triggering the second switch when the belt breaks.

9. A clothes dryer motor adapted to be mounted on a frame of the dryer for driving a dryer belt to rotate a drum of the dryer, the motor comprising:
    a motor frame mountable on the dryer frame and having an outwardly facing surface, and
    a belt break switch mounted on the surface of the motor frame adjacent the belt and having an arm disposed to sense dryer belt breakage, the switch operable to inhibit power to the motor whenever the dryer belt breaks,
    a main switch,
    wherein the break switch and the main switch are provided as an integral unit with the connections between the break switch and the main switch being pre-wired.

10. The dryer motor of claim 9 wherein the break switch cuts power to the motor in response to movement of the arm.

11. The dryer motor of claim 10 wherein the arm is disposed to be moved by an idler arm of the dryer frame, the idler arm moving in response to belt breakage.

12. The dryer motor of claim 9 wherein the switch is an automatic reset switch so that the switch automatically resets after replacement of the broken belt.

13. A clothes dryer motor for rotating a drum of the dryer via a dryer belt, the motor comprising:
    a rotor adapted to rotate the belt,
    a main winding operable to cause rotation of the rotor,
    a start winding operable to cause rotation of the rotor at motor start-up,
    a protector assembly electrically connected to the main and start windings,
    a main switch operable to stop operation of the start winding at a predetermined rotor speed, and
    a motor frame for mounting the rotor, the windings, the protector assembly and the main switch, the frame having a surface, the protector assembly including a belt switch having an arm, the belt switch being mounted on the surface of the frame and operable to stop operation of the motor whenever a belt malfunction occurs,
    wherein the protector assembly is in series with the main and start windings.

14. A clothes dryer motor for rotating a drum of the dryer via a dryer belt, the motor comprising:
    a rotor adapted to rotate the belt,
    a main winding operable to cause rotation of the rotor,
    a start winding operable to cause rotation of the rotor at motor start-up,
    a protector assembly electrically connected to the main and start windings,
    a main switch operable to stop operation of the start winding at a predetermined rotor speed, and
    a motor frame for mounting the rotor, the windings, the protector assembly and the main switch, the frame having a surface, the protector assembly including a belt switch having an arm, the belt switch being mounted on the surface of the frame and operable to stop operation of the motor whenever a belt malfunction occurs, wherein the belt switch, the main switch and the motor frame are provided as an integral unit and the connections between the belt switch and the main switch are pre-wired.

15. A clothes dryer comprising:

a dryer frame, a drum mounted on the dryer frame, a belt connected to the dryer frame, and a motor mounted on the dryer frame and connected to the belt to rotate the belt and drum, the motor including:

motor frame mounted on the dryer frame and having an outwardly facing surface, and a belt break switch mounted on the surface of the motor frame adjacent the belt and having an arm disposed to sense belt breakage, the switch operable to inhibit power to the motor whenever the dryer belt breaks, a main switch, wherein the break switch, the main switch and the motor frame are provided as an integral unit with the connections between the break switch and the main switch being pre-wired.

16. The dryer motor of claim 15 wherein the break switch cuts power to the motor in response to movement of the arm.

17. The dryer motor of claim 16 wherein the arm is disposed to be moved by an idler arm of the dryer frame, the idler arm moving in response to belt breakage.

* * * * *

UNITED STATES PATENT AND TRADEMARK OFFICE
CERTIFICATE OF CORRECTION

PATENT NO.       : 7,609,491 B2                                     Page 1 of 1
APPLICATION NO. : 11/549192
DATED            : October 27, 2009
INVENTOR(S)      : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this

Twelfth Day of October, 2010

David J. Kappos
*Director of the United States Patent and Trademark Office*